United States Patent
Lee et al.

(10) Patent No.: US 8,460,565 B2
(45) Date of Patent: Jun. 11, 2013

(54) PROCESS FOR FABRICATING PATTERNED MAGNETIC RECORDING DEVICE

(75) Inventors: Kim Y Lee, Fremont, CA (US); Hong Ying Wang, Fremont, CA (US); Nobuo Kurataka, Campbell, CA (US); Christopher Formato, Brentwood, CA (US); David S Kuo, Palo Alto, CA (US); Dieter K Weller, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 301 days.

(21) Appl. No.: 12/768,616

(22) Filed: Apr. 27, 2010

(65) Prior Publication Data

US 2010/0221581 A1 Sep. 2, 2010

Related U.S. Application Data

(62) Division of application No. 11/583,845, filed on Oct. 20, 2006, now Pat. No. 7,704,614.

(51) Int. Cl.
*B44C 1/22* (2006.01)

(52) U.S. Cl.
USPC ............... 216/22; 216/39; 216/41; 438/722; 438/725

(58) Field of Classification Search
USPC ........ 216/22, 27, 75, 78, 39, 41, 66; 428/827, 428/828; 438/720, 722, 725
See application file for complete search history.

(56) References Cited

U.S. PATENT DOCUMENTS

| | | | |
|---|---|---|---|
| 4,308,592 A * | 12/1981 | McGouey | 365/8 |
| 4,379,183 A | 4/1983 | Araki et al. | |
| 4,404,238 A | 9/1983 | Baldwin | |
| 4,606,971 A | 8/1986 | Ido et al. | |
| 4,636,433 A | 1/1987 | Kubo et al. | |
| 4,978,584 A | 12/1990 | Reim et al. | |

(Continued)

FOREIGN PATENT DOCUMENTS

| | | |
|---|---|---|
| DE | 19651579 | 6/1997 |
| DE | 10026050 | 12/2000 |

(Continued)

OTHER PUBLICATIONS

From U.S. Appl. No. 11/583,845:—Issue Notification dated Apr. 7, 2010—Notice of Allowance dated Dec. 8, 2009—Rejections dated, Jun. 29, 2009, Feb. 26, 2009, Jun. 2, 2008, Nov. 20, 2007 and—Requirement for Restriction dated Sep. 4, 2007.

(Continued)

*Primary Examiner* — Lan Vinh
(74) *Attorney, Agent, or Firm* — Ladas & Parry LLP

(57) ABSTRACT

A method of fabricating a patterned magnetic recording medium, comprises steps of: (a) providing a layer stack including an uppermost non-magnetic interlayer; (b) forming a resist layer on the interlayer; (c) forming a first pattern comprising a first group of recesses extending through the resist layer and exposing a first group of spaced apart surface portions of the interlayer; (d) filling the first group of recesses with a layer of a hard mask material; (e) selectively removing the resist layer to form a second pattern comprising a second group of recesses extending through the hard mask layer and exposing a second group of spaced apart surface portions of the interlayer; and (f) filling the second group of recesses with a layer of a magnetically hard material forming a magnetic recording layer.

20 Claims, 2 Drawing Sheets

U.S. PATENT DOCUMENTS

| | | | |
|---|---|---|---|
| 5,217,820 A | 6/1993 | Isshiki et al. | |
| 5,473,490 A * | 12/1995 | Somers et al. | 360/321 |
| 5,480,694 A | 1/1996 | Daimon et al. | |
| 5,503,911 A | 4/1996 | Aoki et al. | |
| 5,503,922 A | 4/1996 | Shimasaki et al. | |
| 5,587,223 A | 12/1996 | White | |
| 5,750,270 A | 5/1998 | Tang et al. | |
| 5,768,075 A | 6/1998 | Bar-Gadda | |
| 5,772,905 A | 6/1998 | Chou | |
| 5,820,769 A | 10/1998 | Chou | |
| 5,834,085 A | 11/1998 | Lairson et al. | |
| 5,850,324 A | 12/1998 | Wu et al. | |
| 5,956,216 A | 9/1999 | Chou | |
| 5,965,194 A | 10/1999 | Truong et al. | |
| 6,007,623 A | 12/1999 | Thiele et al. | |
| 6,055,139 A | 4/2000 | Ohtsuka et al. | |
| 6,086,974 A | 7/2000 | Thiele et al. | |
| 6,136,061 A | 10/2000 | Gibson | |
| 6,136,428 A | 10/2000 | Truong et al. | |
| 6,168,845 B1 | 1/2001 | Fontana, Jr. et al. | |
| 6,324,032 B1 | 11/2001 | Ohtsuka et al. | |
| 6,383,597 B1 | 5/2002 | Fullerton et al. | |
| 6,383,598 B1 | 5/2002 | Fullerton et al. | |
| 6,391,430 B1 | 5/2002 | Fullerton et al. | |
| 6,414,808 B1 | 7/2002 | Allenspach et al. | |
| 6,440,520 B1 | 8/2002 | Balglin et al. | |
| 6,440,589 B1 | 8/2002 | Fullerton et al. | |
| 6,500,497 B1 | 12/2002 | Wang et al. | |
| 6,617,012 B1 | 9/2003 | Wang et al. | |
| 6,656,613 B2 | 12/2003 | Litvinov et al. | 428/694 TM |
| 6,753,130 B1 | 6/2004 | Liu et al. | |
| 6,773,764 B2 | 8/2004 | Marinero et al. | |
| 6,838,227 B2 | 1/2005 | Wang et al. | |
| 6,841,224 B2 * | 1/2005 | Kamata et al. | 428/836.3 |
| 6,898,031 B1 | 5/2005 | Belser et al. | |
| 6,949,199 B1 | 9/2005 | Gauzner et al. | |
| 6,969,625 B2 * | 11/2005 | Cyrille et al. | 438/24 |
| 7,167,342 B2 | 1/2007 | Yasui et al. | |
| 2001/0016271 A1 | 8/2001 | Aoyama | |
| 2002/0037439 A1 | 3/2002 | Litvinov et al. | |
| 2002/0160541 A1 * | 10/2002 | Durcan et al. | 438/3 |
| 2003/0082410 A1 | 5/2003 | Sato et al. | |
| 2003/0235717 A1 | 12/2003 | van de Veerdonk et al. | |
| 2004/0053073 A1 | 3/2004 | Lu et al. | |
| 2004/0080847 A1 | 4/2004 | Lundstrom | |
| 2004/0151949 A1 | 8/2004 | Oikawa et al. | |
| 2004/0241570 A1 | 12/2004 | Shibata et al. | |
| 2005/0201176 A1 | 9/2005 | Zangari et al. | |
| 2005/0255337 A1 | 11/2005 | Mukai | |
| 2005/0271819 A1 | 12/2005 | Wago et al. | |
| 2006/0230601 A1 | 10/2006 | Gill et al. | |

FOREIGN PATENT DOCUMENTS

| | | |
|---|---|---|
| EP | 0797192 | 9/1997 |
| EP | 0808497 | 11/1997 |
| GB | 2302980 | 2/1997 |
| WO | 01/99100 | 12/2001 |

OTHER PUBLICATIONS

E. A. M. Van Alphen et al., "Granular Co/Ag Multilayers: Relation Between Nanostructure, and Magnetic and Transport Properties", Physcial Review B vol. 51 No. 13, Apr. 1, 1995, pp. 8182-8192.

J.S. Yin et al., "Ordered Self-Assembling of Tetrahedral Oxide Nanocrystals", Physical Review Letters, vol. 79, No. 13, Sep. 29, 1997, pp. 2570-2573.

H. Brune et al., "Self-Organized Growth of Nanostructure Arrays on Strain-Relief Patterns," Letters to Nature, vol. 394, Jul. 30, 1998, pp. 451-453.

O. Fruchart et al., "Self Organized Growth of Nanosized Vertical Magnetic Co. Pillars on Au (111)", Physical Review Letters, vol. 83, No. 14, Oct 4, 1999, pp. 2769-2772.

S.P. Li et al., "Magnetic Nanoscale Dots on Colloid Crystal Surfaces" Applied Physical Letters, vol. 76, No. 6, Feb. 7, 2000, pp. 748-750.

S.L. Silva et al., "Fabraicating Nanometer-Scale Co Dot and Line arrays on CU(100) Surfaces", Applied Physical Letters, vol. 76, No. 9, Feb. 28, 2000, pp. 1128-1130.

S. Sun et al., "Monodisperse FePt Nanoparticles and Ferromagnetic FePt Nanocrystal Superlattices", Science vol. 287, Mar. 17, 2000, pp. 1989-1992.

D. Babonneau et al., "Evidence for a Self-Organized Growth in Granular $Co/Al_2O_3$ Multilayers", Applied Physical Lettes, vol. 76, No. 20, May 15, 2000, pp. 2892-2894.

From U.S. Appl. No. 10/337,103:—Notice of Allowance dated Jul. 31, 2006—Office Actions dated Jan. 9, 2006, Sep. 12, 2005, Mar. 10, 2005, Sep. 9, 2004, Apr. 8, 2004.

* cited by examiner

PROCESS FOR FABRICATING PATTERNED MAGNETIC RECORDING DEVICE

CROSS REFERENCE TO RELATED APPLICATIONS

This application is a divisional of U.S. patent application Ser. No. 11/583,845, now U.S. Pat. No. 7,704,614, filed Oct. 20, 2006 which is hereby incorporated by reference in its entirety.

FIELD OF THE INVENTION

The present invention relates to an improved method for fabricating patterned magnetic recording media, such as bit patterned perpendicular magnetic media, utilizing "in-laid", or "damascene"-type, processing methodology. The invention has particular utility in the manufacture of ultra-high areal recording density magnetic recording media such as utilized in computer-related applications, e.g., hard disk drives.

BACKGROUND OF THE INVENTION

Designers, manufacturers, and users of electronic computers and computing systems require reliable and efficient equipment for storage and retrieval of information in digital form. Conventional storage systems, such as magnetic disk drives, are typically utilized for this purpose and are well known in the art. However, the amount of information that is digitally stored continually increases, and designers and manufacturers of magnetic recording media work to increase the storage capacity of magnetic disks.

In conventional magnetic disk data/information storage, the data/information is stored in a continuous magnetic thin film overlying a substantially rigid, non-magnetic disk. Each bit of data/information is stored by magnetizing a small area of the thin magnetic film using a magnetic transducer (write head) that provides a sufficiently strong magnetic field to effect a selected alignment of the small area (magnetic grain) of the film. The magnetic moment, area, and location of the small area comprise a bit of binary information which must be precisely defined in order to allow a magnetic read head to retrieve the stored data/information.

Conventional thin-film type magnetic media, wherein a fine-grained polycrystalline magnetic alloy layer serves as the active recording layer, are generally classified as "longitudinal" or "perpendicular", depending upon the orientation of the residual magnetization of the grains of the magnetic material.

Perpendicular recording media have been found to be superior to longitudinal media in achieving higher bit densities without experiencing the thermal stability limit associated with the latter (described in more detail below). In perpendicular magnetic recording media, residual magnetization is formed in a direction ("easy axis") perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media.

Efficient, high bit density recording utilizing a perpendicular magnetic medium typically requires interposition of a relatively thick (as compared with the magnetic recording layer), magnetically "soft" underlayer ("SUL"), i.e., a magnetic layer having a relatively low coercivity typically not greater than about 1 kOe, such as of a NiFe alloy (Permalloy), between a non-magnetic substrate, e.g., of glass, aluminum (Al) or an Al-based alloy, and a magnetically "hard" recording layer having relatively high coercivity, typically about 3-8 kOe, e.g., of a cobalt-based alloy (e.g., a Co—Cr alloy such as CoCrPtB) having perpendicular anisotropy. The magnetically soft underlayer serves to guide magnetic flux emanating from the head through the magnetically hard perpendicular recording layer.

A conventionally structured perpendicular recording system 10 with a perpendicularly oriented magnetic medium 1 and a magnetic transducer head 9 is schematically illustrated in cross-section in FIG. 1, wherein reference numeral 2 indicates a non-magnetic substrate, reference numeral 3 indicates an optional adhesion layer, reference numeral 4 indicates a relatively thick magnetically soft underlayer (SUL), reference numeral 5 indicates an "intermediate" layer stack 5 which may include at least one non-magnetic interlayer $5_B$ of a hcp material adjacent the magnetically hard perpendicular recording layer 6 and an optional seed layer $5_A$ adjacent the magnetically soft underlayer (SUL) 4, and reference numeral 6 indicates at least one relatively thin magnetically hard perpendicular recording layer with its magnetic easy axis perpendicular to the film plane.

The relatively thin interlayer 5, comprised of one or more layers of non-magnetic materials, e.g., interlayer $5_B$ and seed layer $5_A$, serves to (1) prevent magnetic interaction between the magnetically soft underlayer (SUL) 4 and the at least one magnetically hard recording layer 6; and (2) promote desired microstructural and magnetic properties of the at least one magnetically hard recording layer 6.

Still referring to FIG. 1, reference numerals $9_M$ and $9_A$, respectively, indicate the main (writing) and auxiliary poles of the magnetic transducer head 9. As shown by the arrows in the figure indicating the path of the magnetic flux Φ, flux Φ emanates from the main writing pole $9_M$ of magnetic transducer head 9, enters and passes through the at least one vertically oriented, magnetically hard recording layer 6 in the region below main pole $9_M$, enters and travels within soft magnetic underlayer (SUL) 4 for a distance, and then exits therefrom and passes through the at least one perpendicular hard magnetic recording layer 6 in the region below auxiliary pole $9_A$ of transducer head 9. The relative direction of movement of perpendicular magnetic medium 21 past transducer head 9 is indicated by the arrow in the figure.

Completing the layer stack of medium 1 is a protective overcoat layer 7, such as of a diamond-like carbon (DLC), formed over magnetically hard layer 6, and a lubricant topcoat layer 8, such as of a perfluoropolyether (PFPE) material, formed over the protective overcoat layer.

Substrate 2, in hard disk applications, is disk-shaped and comprised of a non-magnetic metal or alloy, e.g., Al or an Al-based alloy, such as Al—Mg having a Ni—P plating layer on the deposition surface thereof, or alternatively, substrate 2 is comprised of a suitable glass, ceramic, glass-ceramic, polymeric material, or a composite or laminate of these materials. Optional adhesion layer 3, if present on substrate surface 2, may comprise a less than about 200 Å thick layer of a metal or a metal alloy material such as Ti, a Ti-based alloy, Ta, a Ta-based alloy, Cr, or a Cr-based alloy. The relatively thick soft magnetic underlayer 4 may be comprised of an about 50 to about 300 nm thick layer of a soft magnetic material such as Ni, Co, Fe, an Fe-containing alloy such as NiFe (Permalloy), FeN, FeSiAl, FeSiAlN, FeTaC, a Co-containing alloy such as CoZr, CoZrCr, CoZrNb, or a Co—Fe-containing alloy such as CoFeZrNb, CoFeZrTa, CoFe, FeCoB, FeCoCrB, and FeCoC. Relatively thin intermediate layer stack 5 may comprise an about 50 to about 300.ANG. thick layer or layers of non-magnetic material(s). For example, intermediate layer stack 5 includes at least one non-magnetic interlayer $5_B$ of a hcp material, such as Ru, TiCr, Ru/CoCr$_{37}$Pt$_6$, RuCr/CoCrPt, etc., adjacent the magnetically hard perpendicular recording layer 6. When present, seed layer $5_A$ adjacent the magnetically soft underlayer (SUL) 4 may comprise a less than about 100 Å thick layer of an fcc material, such as an alloy of Cu, Ag, Pt, or Au, or a material such as Ta, TaW, CrTa, Ti, TiN, TiW, or TiCr. The at least one magnetically hard perpendicular recording layer 6 preferably comprises a high coercivity magnetic alloy with a hexagonal close-packed (hcp) <0001> basal plane crystal structure with uniaxial crystalline anisotropy and magnetic easy axis (c-axis) oriented perpendicular to the surface of the magnetic layer or film. Such magnetically hard perpendicular recording layers typically comprise an about 6 to about 25 nm thick layer(s) of Co-based alloy(s) including one or more elements selected from the group consisting of Cr, Fe, Ta, Ni, Mo, Pt, W, Cr, Ru, Ti, Si, O, V, Nb, Ge, B, and Pd.

Conventional, continuous magnetic film storage media such as described above incur several drawbacks and disadvantages which adversely affect realization of high areal density data/information storage, as follows:

(1) the boundaries between adjacent pairs of bits tend to be ragged in continuous magnetic films, resulting in noise generation during reading; and (2) the requirement for increased areal recording density has necessitated a corresponding decrease in recording bit size or area. Consequently, recording bit sizes of continuous film media have become extremely minute, e.g., on the order of nanometers (nm). In order to obtain a sufficient output signal from such minute bits, the saturation magnetization ($M_s$) and thickness of the film must be as large as possible. However, the magnetization quantity of such minute bits is extremely small, resulting in a loss of stored information due to magnetization reversal by "thermal fluctuation", also known as the "superparamagnetic effect".

Regarding item (2) above, it is further noted that for longitudinal type continuous magnetic media, wherein the magnetic easy axis is oriented parallel to the film plane (i.e., surface), magnetization reversal by the superparamagnetic effect may occur even with relatively large magnetic particles or grains, thereby limiting future increases in areal recording density to levels necessitated by current and projected computer-related applications. On the other hand, for perpendicular type continuous magnetic media, wherein the magnetic easy axis is oriented perpendicular to the film plane (i.e., surface), growth of the magnetic particles or grains in the film thickness direction increases the volume of magnetization of the particles or grains while maintaining a small cross-sectional area (as measured in the film plane). As a consequence, onset of the superparamagnetic effect can be suppressed for very small particles or grains of minute width. However, further decrease in grain width in perpendicular media necessitated by increasing requirements for areal recording density will inevitably result in onset of the superparamagnetic effect even for such type media.

The superparamagnetic effect is a major limiting factor in increasing the areal recording density of continuous film magnetic recording media. Superparamagnetism results from thermal excitations which perturb the magnetization of grains in a ferromagnetic material, resulting in unstable magnetization. As the grain size of magnetic media is reduced to achieve higher areal recording density, the superparamagnetic instabilities become more problematic. The superparamagnetic effect is most evident when the grain volume V is sufficiently small such that the inequality $K_\mu V/k_B T > 40$ cannot be maintained, where $K_\mu$ is the magnetic crystalline anisotropy energy density of the material, $k_B$ is Boltzmann's constant, and T is the absolute temperature. When this inequality is not satisfied, thermal energy demagnetizes the individual magnetic grains and the stored data bits are no longer stable. Consequently, as the magnetic grain size is decreased in order to increase the areal recording density, a threshold is reached for a given $K_\mu$ and temperature T such that stable data storage is no longer possible.

So-called "patterned" or "bit patterned" magnetic media ("BPM") have been proposed as a means for overcoming the above-described problem of conventional continuous magnetic media associated with magnetization reversal via the superparamagnetic effect, e.g., as disclosed in U.S. Pat. No. 5,956,216, the entire disclosure of which is incorporated herein by reference. The term "bit patterned media" ("BPM") generally refers to magnetic data/information storage and retrieval media wherein a plurality of discrete, independent regions of magnetic material which form discrete, independent magnetic elements that function as recording bits are formed on a non-magnetic substrate. Since the regions of ferromagnetic material comprising the magnetic bits or elements are independent of each other, mutual interference between neighboring bits can be minimized. As a consequence, bit patterned magnetic media are advantageous vis-a-vis continuous magnetic media in reducing recording losses and noise arising from neighboring magnetic bits. In addition, patterning of the magnetic layer advantageously increases resistance to domain wall movement, i.e., enhances domain wall pinning, resulting in improved magnetic performance characteristics.

Generally, each magnetic bit or element has the same size and shape, and is composed of the same magnetic material as the other elements. The elements are arranged in a regular pattern over the substrate surface, with each element having a small size and desired magnetic anisotropy, so that, in the absence of an externally applied magnetic field, the magnetic moments of each discrete magnetic element will be aligned along the same magnetic easy axis. The magnetic moment of each discrete magnetic element therefore has only two states: the same in magnitude but aligned in opposite directions. Each discrete magnetic element forms a single magnetic domain or bit and the size, area, and location of each domain is determined during the fabrication process.

During writing operation of patterned media, the direction of the magnetic moment of the single magnetic domain element or bit is flipped along the easy axis, and during reading operation, the direction of the magnetic moment of the single magnetic domain element or bit is sensed. While the direction of the magnetic easy axis of each of the magnetic domains, elements, or bits can be parallel or perpendicular to the surface of the domain, element, or bit, corresponding to conventional continuous longitudinal and perpendicular media, respectively, bit patterned media comprised of domains, elements, or bits with perpendicularly oriented magnetic easy axis are advantageous in achieving higher areal recording densities for the reasons given above.

Bit patterned media in disk form offer a number of advantages relative to conventional disk media. In principle, the writing process is greatly simplified, resulting in much lower noise and lower error rate, thereby allowing much higher areal recording density. In bit patterned media, the writing process does not define the location, shape, and magnetization value of a bit, but merely flips the magnetization orientation of a patterned single domain magnetic structure. Also in principle, writing of data can be essentially perfect, even when the transducer head deviates slightly from the intended bit location and partially overlaps neighboring bits, as long as only the magnetization direction of the intended bit is flipped. By contrast, in conventional magnetic disk media, the writing process must define the location, shape, and magnetization of a bit. Therefore, with such conventional disk media, if the transducer head deviates from the intended location, the head will write to part of the intended bit and to part of the neighboring bits. Another advantage of bit patterned media is that crosstalk between neighboring bits is reduced relative to conventional media, whereby areal recording density is increased. Each individual magnetic element, domain, or bit of a patterned medium can be tracked individually, and reading is less jittery than in conventional disks.

Bit patterned magnetic recording media have been fabricated by a variety of processing techniques, including etching processing such as reactive ion etching, sputter etching, ion milling, and ion irradiation to form a pattern comprising magnetic and non-magnetic surface areas in a layer of magnetic material on a media substrate. Several of the these processing techniques have relied upon selective removal of portions of the layer of magnetic material to form the pattern of magnetic and non-magnetic surface areas; whereas others of the processing techniques have relied upon partial removal of selected areas of the media substrate on which the magnetic layer is formed, thereby resulting in different transducer head/media surface spacings having an effect similar to formation of a pattern of magnetic and non-magnetic surface areas in the layer of magnetic material. However, a drawback associated with each of these techniques is formation of topographical patterns in the surface of the media, engendering media performance concerns such as transducer head flyability and corrosion, e.g., due to uneven lubricant thickness and adhesion. A particular drawback associated with a "subtractive" process, i.e., wherein a continuous magnetic recording layer is initially deposited on a substrate and then patterned via ion milling or sputter etching, is the difficulty in accurately performing the milling or etching steps because of redeposition of the removed material(s).

As for formation of patterned magnetic media via ion irradiation, a drawback associated therewith is the requirement for use of a high dose of ion irradiation for sufficient suppression of the magnetic properties of the magnetic layer at the selectively irradiated surface areas. Such high dose ion irradiation typically requires an extended processing interval and removal of the ion-irradiated resist materials (utilized for defining the pattern of ion-irradiated surface areas) is difficult.

In view of the foregoing, there exists a need for improved processing methodology and techniques which substantially eliminate the above-described disadvantages, drawbacks, and difficulties associated with the above-described methodologies and techniques for fabricating patterned magnetic media. More specifically, there exists a need for improved processing methodology and techniques for cost-effectively fabricating servo-patterned media, track-patterned (i.e., discrete track) media, and bit-patterned (i.e., discrete bit) media, particularly as utilized in hard disk data/information storage and retrieval systems.

The present invention addresses and solves the above-described problems associated with the above-described methodologies and techniques for fabricating patterned magnetic media, while maintaining full compatibility with all aspects of cost-effective, automated manufacturing processing for pattern formation in magnetic media. Further, the methodology afforded by the present invention enjoys diverse utility in the manufacture of all manner of devices and products requiring pattern formation in a layer of magnetic material.

DISCLOSURE OF THE INVENTION

An advantage of the present invention is an improved method of fabricating patterned magnetic recording media.

Another advantage of the present invention is an improved method of fabricating bit patterned magnetic recording media.

Yet another advantage is improved patterned media fabricated by the method of the present invention.

Still another advantage is improved bit patterned media fabricated by the method of the present invention.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved method of fabricating a patterned magnetic recording medium, comprising steps of:

(a) providing a layer stack including an uppermost non-magnetic interlayer;

(b) forming a resist layer on the interlayer;

(c) forming a first pattern comprising a first group of recesses extending through the resist layer and exposing a first group of spaced apart surface portions of the interlayer;

(d) filling the first group of recesses with a layer of a hard mask material;

(e) selectively removing the resist layer to form a second pattern comprising a second group of recesses extending through the hard mask layer and exposing a second group of spaced apart surface portions of the interlayer; and (f) filling the second group of recesses with a layer of a magnetically hard material forming a magnetic recording layer.

In accordance with embodiments of the present invention, step (a) comprises providing a layer stack comprising, in overlying sequence, a non-magnetic substrate, a magnetically soft underlayer ("SUL"), a seed layer, and said interlayer; wherein: the substrate comprises a material selected from the group consisting of: Al, Al-based alloys, NiP-coated Al or Al-based alloys, glass, ceramic, glass-ceramic, polymeric materials, and composites or laminates of these materials; the SUL comprises a material selected from the group consisting of: Ni, Co, Fe, NiFe (Permalloy), FeN, FeSiAl, FeSiAlN, FeTaC, CoZr, CoZrCr, CoZrNb, CoFeZrNb, CoFeZrTa, CoFe, FeCoB, FeCoCrB, and FeCoC; the seed layer comprises a fcc material selected from the group consisting of: alloys of Cu, Ag, Pt, and Au, or a material selected from the group consisting of: Ta, TaW, CrTa, Ti, TiN, TiW, or TiCr; and the interlayer comprises elemental Ru or an alloy thereof, or a material selected from the group consisting of Pt, Pd, and alloys thereof, the interlayer being lattice matched to the layer of magnetically hard material and promoting growth of the recording layer with a magnetic easy axis perpendicular to a surface thereof.

Embodiments of the present invention include those wherein step (b) comprises forming the resist layer of a material comprising a thermoplastic polymer, e.g., polymethylmethacrylate ("PMMA"), styrene-acrylonitrile ("SAN"), polystyrene, and other thermoplastic polymers.

Preferably, step (c) comprises forming the first pattern by means of an imprinting process and includes removing residual resist material from the bottom of the first group of recesses; step (d) comprises filling the first group of recesses with a layer of a platable hard mask material selected from the group consisting of: Cr, Ta, and Ti; and step (e) comprises selectively removing said resist layer to form said second pattern by means of a plasma ashing process.

According to illustrative, but non-limitative embodiments of the present invention, step (e) comprises forming the second group of recesses with a diameter or width of about 25 nm for fabricating a bit patterned medium with a bit density of about 250 Gbit/in$^2$, or step (e) comprises forming the second group of recesses with a diameter or width of about 12.5 nm for fabricating a bit patterned medium with a bit density of about 1 Tbit/in$^2$.

Preferred embodiments of the present invention include those wherein step (f) comprises filling the recesses by epitaxially depositing the layer of magnetically hard material (e.g., as by electroplating) to form the magnetic recording layer in contact with the exposed surface portions of the interlayer, and the interlayer is formed of elemental Ru or an alloy thereof, or Pt or Pd or an alloy thereof, and is lattice matched to and promotes growth of the perpendicular magnetic recording layer with a hcp <0001> crystal structure with uniaxial crystalline anisotropy and c-axis magnetic easy axis perpendicular to the upper surface thereof. Preferably, the magnetically hard material comprises $Co_xPt$, where x is about 3, or $(Co_xPt)Cr_y$, where x is about 3 and $0.05 \leq y \leq 0.20$.

According to embodiments of the present invention, the method comprises furthers step of:

(g) planarizing the uppermost surface of the structure formed in step (f); and (h) forming a layer of a protective overcoat material on the planarized surface.

Embodiments of the invention include those wherein step (g) comprises chemical-mechanical polishing ("CMP") or ion etching, and step (h) comprises forming a layer of a carbon-containing material.

Another aspect of the present invention is an improved method of fabricating a patterned perpendicular magnetic recording medium, comprising steps of:

(a) providing a layer stack including, in overlying sequence, a non-magnetic substrate, a magnetically soft underlayer ("SUL"), a seed layer, and a Ru layer or a Ru-based alloy layer;

(b) forming a resist layer on the Ru layer or Ru-based alloy layer, the resist layer comprising a thermoplastic polymer material;

(c) forming a first pattern comprising a first group of recesses extending through the resist layer and exposing a first group of spaced apart surface portions of the Ru layer or Ru-based alloy layer;

(d) filling the first pattern of recesses with a layer of a hard mask material;

(e) selectively removing the resist layer to form a second pattern comprising a second group of recesses extending through the hard mask layer and exposing a second group of spaced apart surface portions of the Ru layer or Ru-based alloy layer;

(f) filling the second pattern of recesses with a layer of a magnetically hard material to form a perpendicular magnetic recording layer, the magnetically hard material comprising $Co_xPt$, where x is about 3, or $(Co_xPt) Cr_y$, where x is about 3 and $0.05 \leq y \leq 0.20$, the Ru or Ru-based alloy layer being lattice matched to and promoting growth of said perpendicular magnetic recording layer with a hcp <0001> crystal structure with uniaxial crystalline anisotropy and c-axis magnetic easy axis perpendicular to the upper surface thereof;

(g) planarizing the surface of the structure formed in step (f); and (h) forming a layer of a protective overcoat material on the planarized surface.

According to embodiments of the present invention, the substrate comprises a material selected from the group consisting of: Al, Al-based alloys, NiP-coated Al or Al-based alloys, glass, ceramic, glass-ceramic, polymeric materials, and composites or laminates of these materials; the SUL comprises a material selected from the group consisting of: Ni, Co, Fe, NiFe (Permalloy), FeN, FeSiAl, FeSiAlN, FeTaC, CoZr, CoZrCr, CoZrNb, CoFeZrNb, CoFeZrTa, CoFe, FeCoB, FeCoCrB, and FeCoC; and the seed layer comprises a fcc material selected from the group consisting of: alloys of Cu, Ag, Pt, and Au, or a material selected from the group consisting of: Ta, TaW, CrTa, Ti, TiN, TiW, or TiCr.

Still another aspect of the present invention is an improved patterned or bit patterned perpendicular magnetic recording medium fabricated by the above method.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features, and the same reference numerals are employed throughout the disclosure for designating similar features, wherein.

DESCRIPTION OF THE INVENTION

The present invention addresses and effectively obviates the above-described problems attendant upon forming patterned magnetic layers and devices comprising same, e.g., servo patterned, track patterned, and bit patterned magnetic disk recording media, while maintaining full compatibility with all aspects of automated manufacturing processing for pattern formation in magnetic layers. An advantage of the present method is increased flexibility in the choice of hard mask materials vis-a-vis other fabrication methodologies. In addition, the inventive methodology can be practiced in large-scale, cost-effective manner for the manufacture of various types of magnetic recording media without requiring capital-intensive processing techniques while minimizing the number of required patterning steps. Further, as has been mentioned, the methodology afforded by the present invention enjoys diverse utility in the manufacture of all manner of devices and products requiring pattern formation in a layer of magnetic material.

Key features of the inventive methodology for forming patterned perpendicular magnetic recording media (such as bit patterned perpendicular) media according to a preferred, but non-limitative, embodiment of the invention include process steps of: providing a layer stack including an uppermost non-magnetic interlayer; forming a resist layer on the interlayer; forming a first pattern comprising a first group of recesses extending through the resist layer and exposing a first group of spaced apart surface portions of the interlayer; filling the first group of recesses with a layer of a hard mask material; selectively removing the resist layer to form a second pattern comprising a second group of recesses extending through the hard mask layer and exposing a second group of spaced apart surface portions of the interlayer; and filling the second group of recesses with a layer of a magnetically hard material forming a magnetic recording layer.

Figure 2:
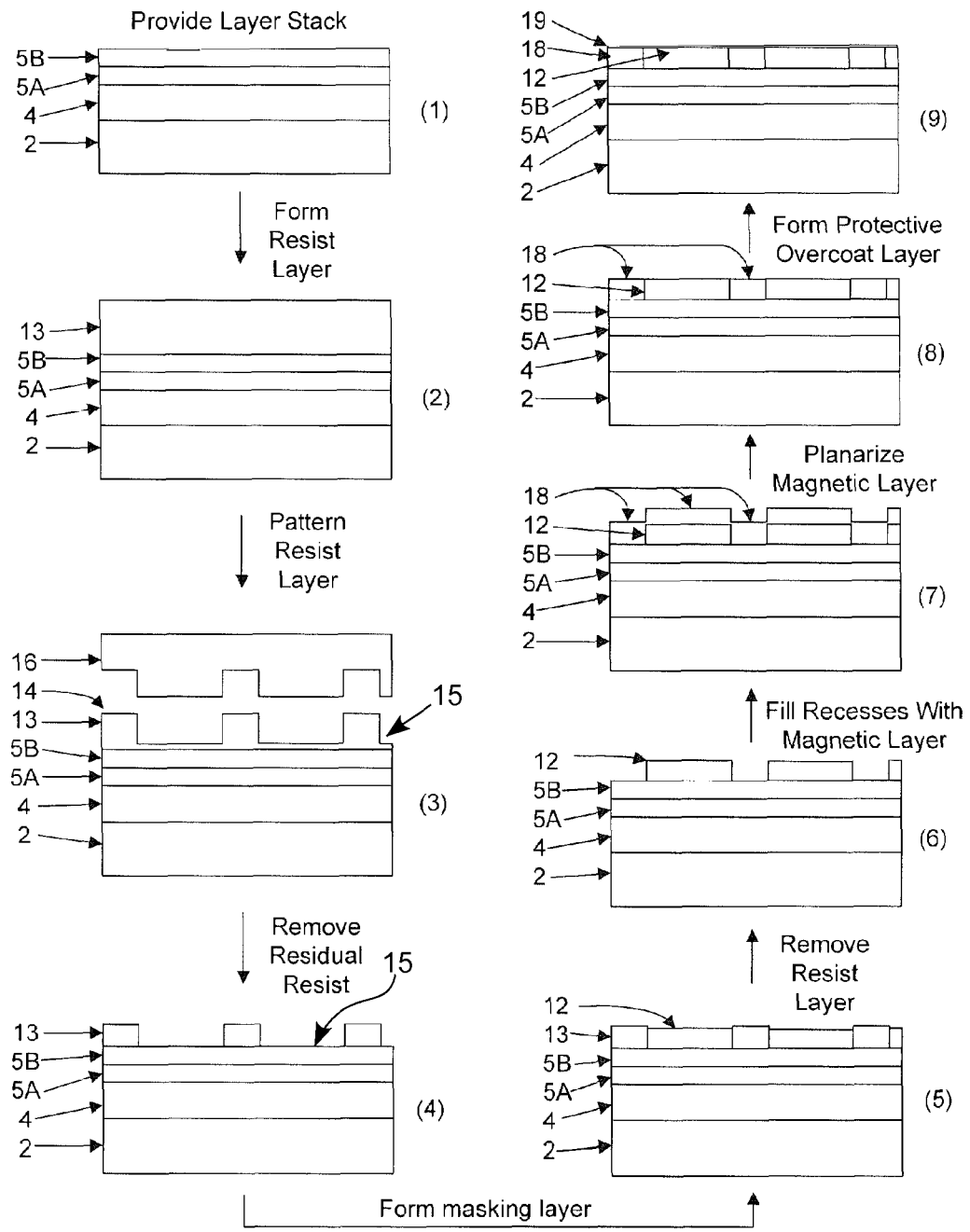
FIG. 2 schematically illustrates, in simplified cross-sectional view, a sequence of steps for fabricating a patterned (e.g., bit patterned) perpendicular magnetic recording medium according to an illustrative, but non-limitative, embodiment of the present invention.

Referring to FIG. 2, schematically illustrated therein, in simplified cross-sectional views, is a sequence of processing steps for fabricating a patterned (e.g., bit patterned) perpendicular magnetic recording medium according to an illustrative, but non-limitative, embodiment of the present invention.

In a first step according to the invention, shown in the first view of FIG. 2, a layer stack 11 is provided, including, in overlying sequence from a non-magnetic substrate 2, a magnetically soft underlayer ("SUL") 4, a seed layer $5_A$, and a non-magnetic interlayer $5_B$. According to embodiments of the invention, substrate 2 is, in hard disk applications, of sufficient thickness to provide the necessary rigidity, and may comprise a material selected from the group consisting of: Al, Al-based alloys, NiP-coated Al or Al-based alloys, glass, ceramic, glass-ceramic, polymeric materials, and composites or laminates of these materials. SUL 4 may comprise an about 20 to about 80 nm thick layer of a material selected from the group consisting of: Ni, Co, Fe, NiFe (Permalloy), FeN, FeSiAl, FeSiAlN, FeTaC, CoZr, CoZrCr, CoZrNb, CoFeZrNb, CoFeZrTa, CoFe, FeCoB, FeCoCrB, and FeCoC. Seed layer $5_A$ may comprise an about 0.5 to about 50 nm thick layer of an fcc material selected from the group consisting of: alloys of Cu, Ag, Pt, and Au, or a material selected from the group consisting of: Ta, TaW, CrTa, Ti, TiN, TiW, or TiCr; and the non-magnetic interlayer $5_B$ may comprise an about 3 to about 15 nm thick layer of elemental Ru or an alloy thereof, or a material selected from the group consisting of Pt, Pd, and alloys thereof, the interlayer being lattice matched to the magnetically hard material subsequently deposited thereon and promoting growth of a recording layer with a hcp <0001> crystal structure with uniaxial crystalline anisotropy and c-axis magnetic easy axis perpendicular to its upper surface. Layer stack 11 may be formed in conventional fashion, as by sputtering or other suitable thin film deposition technique.

In a second step according to the invention, shown in the second view of FIG. 2, a resist layer 13 is formed atop masking layer 12 by any suitable technique, e.g., spin coating. According to a preferred embodiment, resist layer 5 is from about 20 to about 2000 nm thick, preferably about 50 nm thick, and comprised of a thermoplastic polymer material, e.g., polymethylmethacrylate (PMMA), styrene-acrylonitrile (SAN), polystyrene, etc.

According to the next step of the inventive methodology, shown in the third view of FIG. 2, resist layer 13 is subjected to patterning for forming a topographical pattern therein, corresponding to the type of patterned media desired to be formed, e.g., bit patterned media in the illustrated embodiment. As illustrated, the topographical pattern comprises a plurality of elevated areas 14 and recessed areas 15 of appropriate dimensions and spacings for defining the desired pattern of a subsequently deposited magnetic layer. By way of illustration, but not limitation, for bit patterned perpendicular media contemplated by the present invention, each of the recesses may be formed with a diameter or width of about 25 nm for fabricating a bit patterned medium with a bit density of about 250 Gbit/in$^2$, or may be formed with a diameter or width of about 12.5 nm for fabricating a bit patterned medium with a bit density of about 1 Tbit/in$^2$.

Resist layer 13 may be topographically patterned via a number of conventional photolithographic techniques, as well as by UV and thermal imprinting techniques. A thermal imprinting technique suitable for use according to the invention is a Heat-Transfer-Stamp (HTS) process, as disclosed in commonly assigned U.S. Pat. No. 6,949,199 B1, the entire disclosure of which is incorporated herein by reference.

According to the HTS process, a workpiece, i.e., in this instance layer stack 11 including the resist layer 13 of imprintable thermoplastic material formed on the upper surface thereof, is pre-heated to a pre-selected high temperature prior to insertion of the heated layer stack 11 in a stamping/imprinting tool employed for performing thermal imprint lithography, whereby an interval for thermal cycling of the stamping/imprinting tool between higher and lower temperatures is eliminated or at least reduced. According to another key feature of the HTS methodology, the "process window", i.e., the maximum allowable interval between removal of the pre-heated layer stack 11 from the separate heating means and its insertion in the stamping/imprinting tool, is increased by placement of a thermally insulating spacer layer beneath the lower surface of the layer stack, whereby the rate of heat loss therefrom, hence rate of temperature reduction, is reduced.

According to the HTS methodology, a stamper/imprinter 16 having a Ni, Ni alloy, Si, SiO$_2$, or Si$_x$N$_y$ imprinting surface formed with a negative image pattern of the desired pattern features is provided with a thin layer of an anti-sticking or release agent (typically a fluorinated polyether compound such as Zdol™, available from Ausimont, Thorofare, N.J.), and installed in a stamping/imprinting tool, by means of an upper mounting block in contact with the flat upper surface of the stamper/imprinter. The upper mounting block, termed a "top mold", includes a heating means for maintaining the stamper/imprinter 16 at an elevated temperature close to the glass transition temperature T$_g$ of the thermoplastic polymer layer, e.g., ~105° C. for PMMA. Layer stack 11 is heated, as by placing the lower surface thereof in contact with a heater block separate from the stamping/imprinting tool, to an elevated temperature substantially greater than the glass transition temperature (T$_g$) of the PMMA thermoplastic layer, e.g., above about 105° C., typically about 200° C., after which the heated layer stack is rapidly transferred to the stamping/imprinting tool such that its lower surface is supported by a heated bottom mold (maintained at the same temperature below T$_g$ as the heated top mold) and the patterned imprinting surface of the stamper/imprinter 16 pressed into contact with the surface of the heated thermoplastic PMMA layer of the layer stack 11 at a suitable pressure, e.g., about 10 MPa. The short interval required for transfer of the heated layer stack to the stamping/imprinting tool for imprinting of the PMMA resist layer 13 prior to lowering of the temperature of the PMMA layer below a minimum temperature required for imprinting, is termed the "process window". The transfer step is performed consistent with the short interval requirement of the process window, i.e., transfer of the layer stack is performed as rapidly as is practicable. Typically, transfer of the heated layer stack to the stamping/imprinting tool is accomplished within several seconds in order to prevent cooling of the heated PMMA thermoplastic layer to a temperature below that which provides optimal, high quality, faithful replication of the surface features of the imprinting surface of the stamper/imprinter. As a consequence of the high pressure urging of the patterned imprinting surface of the stamper/imprinter against the heated PMMA thermoplastic layer, the surface of the heated thermoplastic PMMA layer is imprinted (i.e., embossed) with the negative image of the desired pattern on the imprinting surface of the stamper/imprinter. The stamper/imprinter 16 is then maintained within the stamping/imprinting tool in contact with the PMMA layer and under pressure for an interval until the temperature of the layer stack with the imprinted PMMA layer thereon is lowered to the fixed temperature of the top and bottom molds, e.g., about 120° C., after which interval the layer stack is separated from the stamper/imprinter to leave replicated features of the imprinting surface in the surface of the PMMA layer and removed from the stamping/imprinting tool.

Thus, by performing the thermal imprinting process according to a sequence of steps wherein the temperature within the stamping/imprinting tool is maintained substantially constant via external pre-heating of the layer stack to a high temperature above the glass transition temperature of the thermoplastic layer, the HTS methodology eliminates, or at least very substantially and significantly reduces the lengthy thermal cycling interval for heating and cooling of the stamping imprinting tool. The HTS methodology affords several advantages, including reduced thermal cycling intervals, reduced imprint cycle times leading to greater product throughput rates, and reduced energy consumption resulting from the elimination or minimization of thermal cycling of the relatively massive stamping/imprinting tool.

In the next step according to the inventive methodology, shown in the fourth view of FIG. 2, residual resist material present after the imprinting process, including resist material remaining at the bottoms of recesses 15, is removed, as by means of ion etching, e.g., reactive ion etching utilizing oxygen ions.

Referring to the fifth view of FIG. 2, in the next step according to the invention, a layer 12 of a hard mask material is selectively formed is formed atop the surface portions of the non-magnetic interlayer $5_B$ exposed within recesses 15. Preferably, layer 12 is comprised of a platable hard mask material, e.g., an electrically conductive material, thereby facilitating selective electrodeposition on the surface portions of the non-magnetic interlayer $5_B$ exposed within recesses 15. According to embodiments of the invention, hard mask layer 12 is from about 10 to about 12 nm thick and may, for example, comprise a metal material selected from the group consisting of: Cr, Ta, and Ti.

In the next step according to the inventive methodology, shown in the sixth view of FIG. 2, the patterned resist layer 13 is selectively removed (stripped) by any suitable process, e.g., by means of plasma ashing or plasma etching utilizing a reactive plasma, e.g., an oxygen ($O_2$) plasma.

According to the next step of the inventive methodology, shown in the seventh view of FIG. 2, each of the spaced apart recesses 15 formed in the non-magnetic masking layer 12 is filled by epitaxially depositing therein (e.g., by electroplating or other suitable epitaxial deposition technique) a layer of a magnetically hard material forming a perpendicular magnetic recording layer 18 in contact with the exposed surface portions of interlayer $5_B$. According to embodiments of the invention, interlayer $5_B$ is preferably formed of elemental Ru or an alloy thereof (or, alternatively of Pt or Pd or an alloy thereof), and is lattice matched to and promotes growth of the perpendicular magnetic recording layer 18 with a hcp <0001> crystal structure with uniaxial crystalline anisotropy and c-axis magnetic easy axis perpendicular to the upper surface thereof. Preferably, the magnetically hard material comprises $Co_xPt$, where x is about 3, or $(Co_xPt)Cr_y$, where x is about 3 and $0.05 \leq y \leq 0.20$.

In the next steps according to the inventive methodology, respectively shown in the eighth and ninth views of FIG. 2, the uppermost surface of the thus-formed structure is planarized, e.g., by means of chemical-mechanical polishing ("CMP") or ion etching, to remove any excess ("overburden") magnetic material overfilling recesses 15, followed by formation thereon of a protective overcoat layer 19, typically a layer of a carbon-containing material, such as a diamond-like carbon ("DLC") layer. A lubricant topcoat layer, not shown in FIG. 2 for illustrative simplicity, is typically formed over the protective overcoat layer 19 when the resultant medium is utilized in hard disk systems with flying head read/write transducers.

Figure 1:
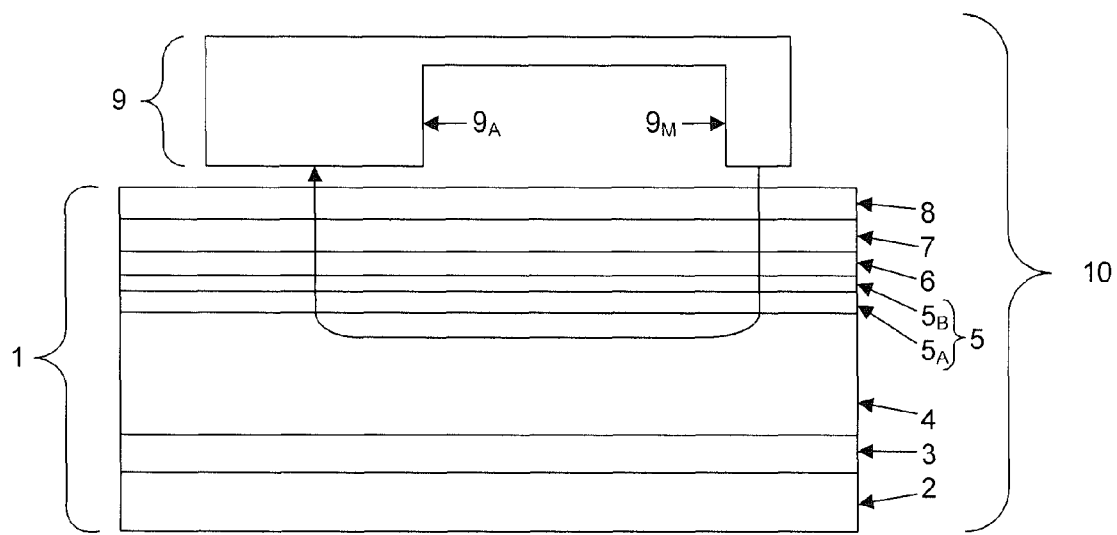
FIG. 1 schematically illustrates, in simplified cross-sectional view, a portion of a conventional magnetic recording, storage, and retrieval system comprised of a conventionally structured, continuous film perpendicular magnetic recording medium and a single-pole magnetic transducer head.
Figure 3:
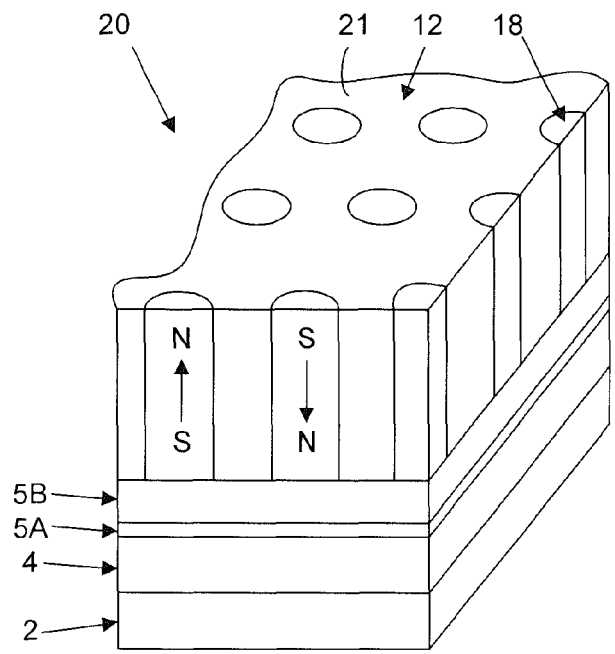
FIG. 3 is a simplified, schematic perspective view of a portion of a bit patterned perpendicular magnetic recording medium according to an illustrative, but non-limitative, embodiment of the present invention.

Adverting to FIG. 3, shown therein is a simplified, schematic perspective view of a portion of a bit patterned perpendicular magnetic recording medium 20 according to an illustrative, but non-limitative, embodiment of the present invention, such as may be formed according to the magnetic patterning process of FIG. 2.

As illustrated, medium 20 resembles the medium of FIG. 2 and comprises, in order, a substrate 2, a soft magnetic underlayer (SUL) 4, a seed layer $5_A$, a non-magnetic interlayer $5_B$, a regularly arrayed plurality of cylindrical column-shaped discrete magnetic elements or bits 18 (sometimes referred to as "dots"), each forming a single magnetic domain, and a material 12 filling the spaces between neighboring elements or bits 18. As shown by the vertically directed arrows in the figure, the cylindrical column-shaped elements or bits 18 have magnetization easy axis vectors of equal magnitude extending in opposing directions along the long axis of each element or bit, which vectors are perpendicular to surface 21 of medium 20.

While in the illustrated embodiment, the elements or bits 18 are shown as cylindrical column-shaped, bit patterned media such as medium 10 are not limited to the exemplary arrangement shown in FIG. 3 and may comprise elements or bits having a variety of shapes, configurations, areal densities, and array patterns. For example, elements or bits 18 may be cylindrically shaped and of equal height (as in the illustrated embodiment), cubic shaped, spherically shaped, or in the form of an elongated parallelepiped, and may be arrayed in linear row and column, hexagonal close-packing, etc., patterns. According to the present invention, bit densities can vary widely, and for example, may range from about 250 $Gbit/in^2$ up to about 10 $Tbit/in^2$. For example, the bits may have a diameter or width of about 25 nm in media with a bit density of about 250 $Gbit/in^2$, and a diameter or width of about 12.5 nm in media with a bit density of about 1 $Tbit/in^2$.

While the above process specifically describes formation of a servo-patterned magnetic recording medium utilizing a stamper/imprinter with a topographically patterned imprinting surface having features in the form of a negative image of a desired bit pattern, the inventive methodology is not limited to the formation of bit patterned media. Rather, as indicated above, the stamper/imprinter may comprise a topographically patterned imprinting surface which comprising features in the form of a negative image of a track-patterned (i.e., discrete track) or servo-patterned medium. Further, the invention can be practiced with a wide variety of workpieces and devices comprising magnetic layers requiring patterning.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of fabricating a patterned magnetic recording device, comprising:
   providing a layer stack including an uppermost non-magnetic interlayer;
   forming a resist layer on said interlayer;
   forming a first pattern comprising a first group of recesses extending through said resist layer and exposing a first group of spaced apart surface portions of said interlayer;
   filling said first group of recesses with a layer of a hard mask material;
   selectively removing said resist layer to form a second pattern comprising a second group of recesses extending through said hard mask layer and exposing a second group of spaced apart surface portions of said interlayer; and
   filling said second group of recesses with a layer of a magnetically hard material forming a magnetic recording layer.

2. The method as in claim 1, wherein:
   providing a layer stack including an uppermost non-magnetic interlayer comprises providing a layer stack comprising, in overlying sequence, a non-magnetic substrate, a magnetically soft underlayer ("SUL"), a seed layer, and said interlayer.

3. The method as in claim 2, wherein:
   said substrate comprises a material selected from the group consisting of: Al, Al-based alloys, NiP-coated Al or Al-based alloys, glass, ceramic, glass-ceramic, polymeric materials, and composites or laminates of these materials;
   said SUL comprises a material selected from the group consisting of: Ni, Co, Fe, NiFe (Permalloy), FeN, FeSiAl, FeSiAlN, FeTaC, CoZr, CoZrCr, CoZrNb, CoFeZrNb, CoFeZrTa, CoFe, FeCoB, FeCoCrB, and FeCoC;
   said seed layer comprises a fcc material selected from the group consisting of: alloys of Cu, Ag, Pt, and Au, or a material selected from the group consisting of: Ta, TaW, CrTa, Ti, TiN, TiW, or TiCr; and
   said interlayer comprises elemental Ru or an alloy thereof, or a material selected from the group consisting of Pt, Pd, and alloys thereof, said interlayer being lattice matched to said layer of magnetically hard material and promoting growth of said recording layer with a magnetic easy axis perpendicular to a surface thereof.

4. The method as in claim 1, wherein:
   forming a resist layer on said interlayer comprises forming said resist layer of a material comprising a thermoplastic polymer.

5. The method as in claim 4, wherein:
   said thermoplastic polymer is selected from the group consisting of polymethylmethacrylate ("PMMA"), styrene-acrylonitrile ("SAN") and polystyrene.

6. The method according to claim 1, wherein:
   forming a first pattern comprising a first group of recesses extending through said resist layer and exposing a first group of spaced apart surface portions of said interlayer comprises forming said first pattern by means of an imprinting process and includes removing residual resist material from the bottom of said first group of recesses.

7. The method as in claim 1, wherein:
   filling said first group of recesses with a layer of a hard mask material comprises filling said first group of recesses with a layer of a platable hard mask material selected from the group consisting of: Cr, Ta, and Ti.

8. The method as in claim 1, wherein:
   selectively removing said resist layer to form a second pattern comprising a second group of recesses extending through said hard mask layer and exposing a second group of spaced apart surface portions of said interlayer comprises selectively removing said resist layer to form said second pattern by means of a plasma ashing process.

9. The method as in claim 1, wherein:
   selectively removing said resist layer to form a second pattern comprising a second group of recesses extending through said hard mask layer and exposing a second group of spaced apart surface portions of said interlayer comprises forming said second group of recesses with a diameter or width of about 25 nm for fabricating a bit patterned device with a bit density of about 1 Tbit/in$^2$.

10. The method as in claim 1, wherein:
    selectively removing said resist layer to form a second pattern comprising a second group of recesses extending through said hard mask layer and exposing a second group of spaced apart surface portions of said interlayer comprises forming said second group of recesses with a diameter or width of about 12.5 nm for fabricating a bit patterned device with a bit density of about 1 Tbit/in$^2$.

11. The method as in claim 1, wherein:
    filling said second group of recesses with a layer of a magnetically hard material forming a magnetic recording layer comprises filling said recesses by epitaxially depositing said layer of magnetically hard material to form said magnetic recording layer in contact with said exposed surface portions of said interlayer.

12. The method as in claim 11, wherein:
    filling said second group of recesses with a layer of a magnetically hard material forming a magnetic recording layer comprises electroplating said layer of magnetically hard material.

13. The method as in claim 11, wherein:
    said interlayer is formed of elemental Ru or an alloy thereof, or Pt or Pd or an alloy thereof, and is lattice matched to and promotes growth of said perpendicular magnetic recording layer with a hcp <0001> crystal structure with uniaxial crystalline anisotropy and c-axis magnetic easy axis perpendicular to the upper surface thereof.

14. The method as in claim 13, wherein:
    said magnetically hard material comprises $Co_xPt$, where x is about 3, or $(Co_xPt)Cr_y$, where x is about 3 and $0.05 \leq y \leq 0.20$.

15. The method as in claim 1, further comprising:
planarizing the uppermost surface of the structure formed by filling said second group of recesses with a layer of a magnetically hard material forming a magnetic recording layer.

16. The method as in claim 15, wherein:
planarizing the uppermost surface of the structure formed by filling said second group of recesses with a layer of a magnetically hard material forming a magnetic recording layer comprises chemical-mechanical polishing ("CMP") or ion etching.

17. The method as in claim 15, further comprising:
forming a layer of a protective overcoat material on the planarized surface.

18. The method as in claim 17, wherein:
forming a layer of a protective overcoat material on the planarized surface comprises forming a layer of a carbon-containing material.

19. A method of fabricating a patterned perpendicular magnetic recording device, comprising:
providing a layer stack including, in overlying sequence, a nonmagnetic substrate, a magnetically soft underlayer ("SUL"), a seed layer, and a Ru layer or a Ru-based alloy layer;
forming a resist layer on said Ru layer or Ru-based alloy layer, said resist layer comprising a thermoplastic polymer material;
forming a first pattern comprising a first group of recesses extending through said resist layer and exposing a first group of spaced apart surface portions of said Ru layer or Ru-based alloy layer;
filling said first pattern of recesses with a layer of a hard mask material;
selectively removing said resist layer to form a second pattern comprising a second group of recesses extending through said hard mask layer and exposing a second group of spaced apart surface portions of said Ru layer or Ru-based alloy layer;
filling said second pattern of recesses with a layer of a magnetically hard material to form a perpendicular magnetic recording layer, said magnetically hard material comprising $Co_xPt$, where x is about 3, or $(Co_xPt)Cr_y$, where x is about 3 and $0.05 \leq y \leq 0.20$, said Ru layer or Ru-based alloy layer being lattice matched to and promoting growth of said perpendicular magnetic recording layer with a hcp <0001> crystal structure with uniaxial crystalline anisotropy and c-axis magnetic easy axis perpendicular to the upper surface thereof;
planarizing the surface of the structure formed by filling said second pattern of recesses with a layer of a magnetically hard material to form a perpendicular magnetic recording layer; and
forming a layer of a protective overcoat material on the planarized surface.

20. The method as in claim 19, wherein:
said substrate comprises a material selected from the group consisting of: Al, Al-based alloys, NiP-coated Al or Al-based alloys, glass, ceramic, glass-ceramic, polymeric materials, and composites or laminates of these materials;
said SUL comprises a material selected from the group consisting of: Ni, Co, Fe, NiFe (Permalloy), FeN, FeSiAl, FeSiAlN, FeTaC, CoZr, CoZrCr, CoZrNb, CoFeZrNb, CoFeZrTa, CoFe, FeCoB, FeCoCrB, and FeCoC; and
said seed layer comprises a fcc material selected from the group consisting of: alloys of Cu, Ag, Pt, and Au, or a material selected from the group consisting of: Ta, TaW, CrTa, Ti, TiN, TiW, or TiCr.

* * * * *